(12) United States Patent
Lettmann et al.

(10) Patent No.: US 9,388,713 B2
(45) Date of Patent: *Jul. 12, 2016

(54) CAMSHAFT

(71) Applicant: Mahle International GmbH, Stuttgart (DE)

(72) Inventors: Markus Lettmann, Kieselbronn (DE); Ralf Rieger, Tamm (DE); Falk Schneider, Korntal-Muenchingen (DE)

(73) Assignee: Mahle International GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/415,525

(22) PCT Filed: Jul. 18, 2013

(86) PCT No.: PCT/EP2013/065141
§ 371 (c)(1),
(2) Date: Jan. 16, 2015

(87) PCT Pub. No.: WO2014/013001
PCT Pub. Date: Jan. 23, 2014

(65) Prior Publication Data
US 2015/0184555 A1    Jul. 2, 2015

(30) Foreign Application Priority Data

Jul. 18, 2012    (DE) .................... 10 2012 212 627

(51) Int. Cl.
*F01L 1/04* (2006.01)
*F01L 1/047* (2006.01)
(Continued)

(52) U.S. Cl.
CPC ............ *F01L 1/047* (2013.01); *B23K 26/0078* (2013.01); *B23P 11/025* (2013.01); *B21D 53/845* (2013.01); *B23P 2700/02* (2013.01)

(58) Field of Classification Search
CPC ... F01L 1/047; B21D 53/845; B23K 26/0078; B23P 2700/02
USPC ........ 123/90.16, 90.44, 90.6, 90.39; 29/888.1
See application file for complete search history.

(56) References Cited

U.S. PATENT DOCUMENTS 4,983,797 A    1/1991    McAllister et al.

FOREIGN PATENT DOCUMENTS

DE    3431361 A1    3/1986
DE    4316012 A1    11/1994
(Continued)

OTHER PUBLICATIONS

International Search Report, PCT/EP2013/065141, dated Nov. 12, 2013 (4 pages).
(Continued)

*Primary Examiner* — Ching Chang
(74) *Attorney, Agent, or Firm* — Fishman Stewart PLLC

(57) ABSTRACT

A camshaft for an internal combustion engine may include a shaft and at least one component thermally joined thereto. The at least one component may be connected via a component-side joining face to a shaft-side joining face of the shaft. At least one of the component-side joining face and the shaft-side joining face may include a predefined roughness introduced and hardened via a laser. The predefined roughness may define at least one track composed of a plurality of individual laser spots. Each of the plurality of individual laser spots may include a center point arranged offset to each other. The plurality of individual laser spots may respectively be arranged to overlapping each other.

20 Claims, 2 Drawing Sheets

(51) Int. Cl.
  *B23P 11/02* (2006.01)
  *B23K 26/00* (2014.01)
  *B21D 53/84* (2006.01)

(56) References Cited

FOREIGN PATENT DOCUMENTS

| | | |
|---|---|---|
| DE | 10325910 A1 | 2/2004 |
| DE | 102005062522 A1 | 6/2007 |
| DE | 102007015958 A1 | 12/2007 |
| DE | 102007023087 A1 | 3/2008 |
| DE | 102009060352 A | 6/2011 |
| DE | 102012202301 A1 | 1/2013 |
| DE | 102011087049 A1 | 5/2013 |
| EP | 0486876 A2 | 5/1992 |
| JP | 2002-257149 A | 9/2002 |
| WO | WO-2013011064 A1 | 1/2013 |

OTHER PUBLICATIONS

English abstract—DE 10 2009 060352 A1, Jun. 30, 2011.
English abstract—JP 2002 257149 A, Sep. 11, 2011.
English abstract—DE 34 31 361 A1, Mar. 6, 1986.
Germany Search Report, dated May 31, 2013 (5 pages).
English abstract—DE 103 25 910 A1, Feb. 26, 2004.
English abstact—DE 10 2005 062 522 A1, Jun. 21, 2007.
English abstact—DE 10 2007 015 958 A1, Dec. 20, 2007.
English abstact—DE 10 2007 023 087 A1, Mar. 27, 2008.
English abstact—DE 10 2011 087 049 A1, May 29, 2013.
English abstact—DE 10 2012 202 301 A1, Jan. 24, 2013.

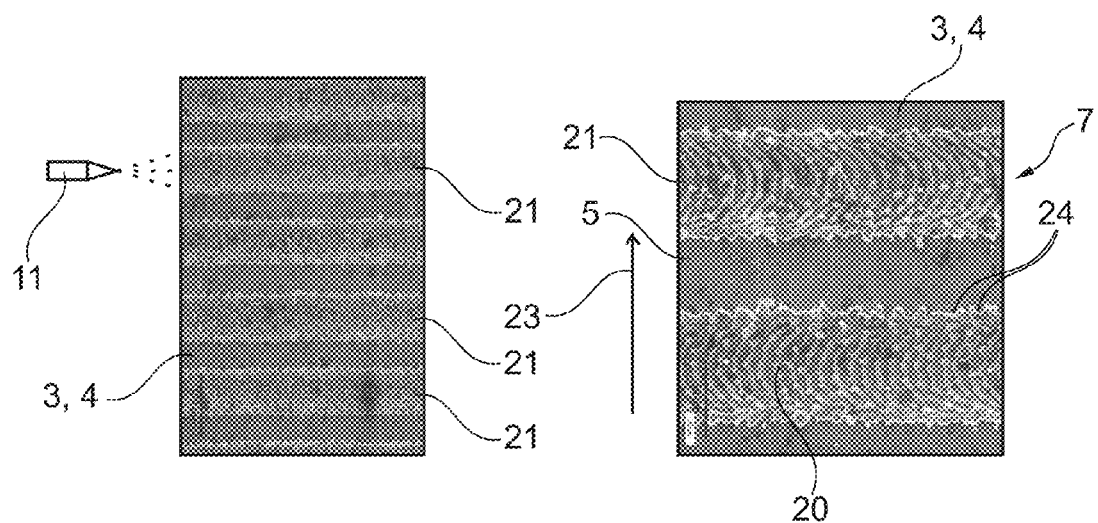
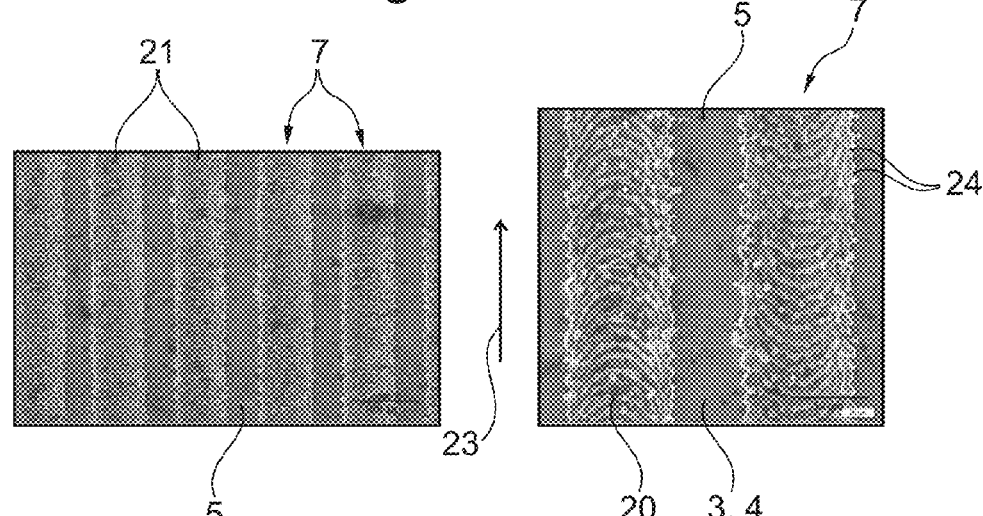
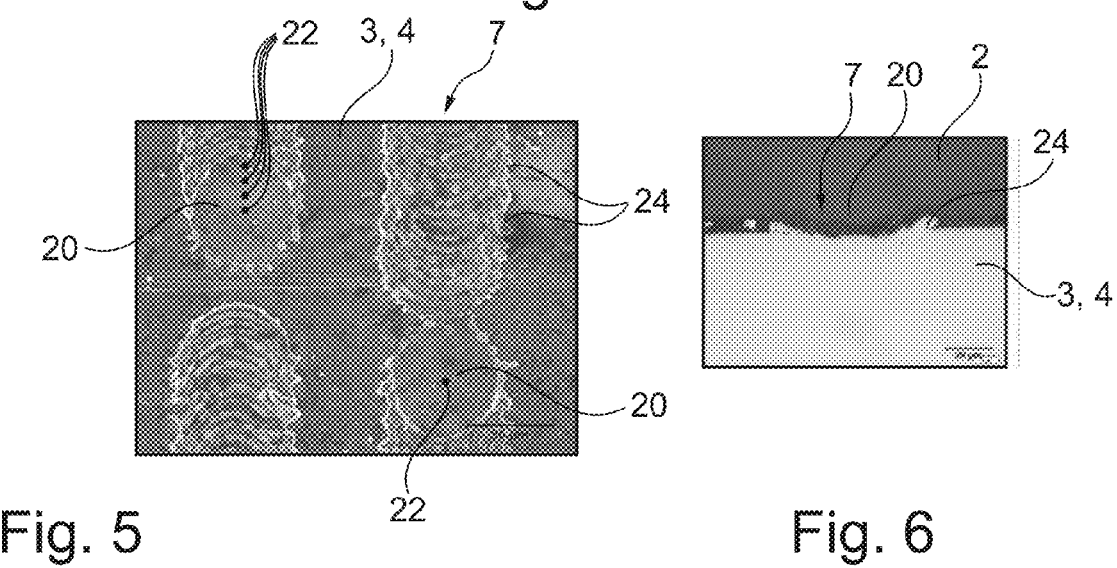
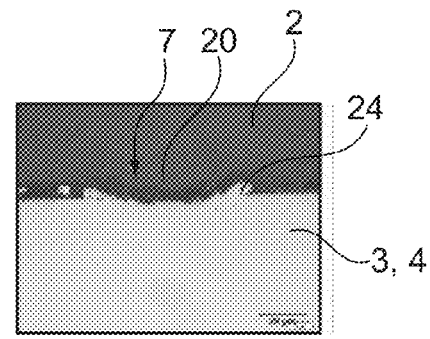
Fig. 3
Fig. 4
Fig. 5
Fig. 6

CAMSHAFT

CROSS-REFERENCE TO RELATED APPLICATIONS

This application claims priority to German Patent Application No. 10 2012 212 627.9, filed Jul. 18, 2012, and International Patent Application No. PCT/EP2013/065141, filed Jul. 18, 2013, both of which are hereby incorporated by reference in their entirety.

TECHNICAL FIELD

The present invention relates to a camshaft according to the preamble of claim 1 and to a cam for such a camshaft.

BACKGROUND

Camshafts are a permanent part of internal combustion engines. The camshaft has a (hollow) shaft, to which at least one cam is joined. Thermal joining methods are generally used to join the shaft and the cam. The connection of the shaft and of the cam is then ensured by means of a cam-side joining face, which is generally arranged in a cam bore, and a shaft-side joining face. The disadvantage of this is that the torque that can be transmitted via the camshaft is limited by the friction between the cam-side joining face and the shaft-side joining face.

DE 10 2009 060 352 A1 discloses a method for producing a camshaft for valve control in an internal combustion engine, comprising the steps: Aligning a plurality of disc-like cams, each having a central, round hole extending perpendicularly to a main cam plane, in such a manner that the holes of the cams arranged at an axial distance from each other align with each other. Supercooling a hollow shaft of round outer profile relative to the cam, the outer diameter of the supercooled hollow shaft being smaller and the outer diameter of the non-supercooled hollow shaft being greater than the inner diameter of the cam holes. Inserting the supercooled hollow shaft into the aligning cam holes. Effecting a temperature equalisation between the hollow shaft and the cams so that the hollow shaft and the cams are connected permanently to form a camshaft, the inner faces of the cam holes and/or the outer face of the hollow shaft having a rough pattern produced by laser ablation in the sections thereof that are surrounded by the cam holes when in the inserted state.

SUMMARY

The present invention is concerned in particular with the problem of specifying an improved or at least an alternative embodiment for a camshaft of the generic type, which in particular has a lower production outlay.

This problem is solved according to the invention by the subject matter of the independent claims. Advantageous embodiments form the subject matter of the dependent claims.

The present invention is based on the general concept of improving a connection between a component and a shaft, for example a torque-transmitting connection between a cam and the camshaft, by roughening a component-side joining face and/or a shaft-side joining face in addition to an in particular thermal joining process. According to the invention, the component-side joining face and/or the shaft-side joining face have a roughness, which is introduced and hardened by means of a laser and has a track composed of individual laser spots, the centre points of the individual laser spots being arranged offset to each other and the individual laser spots being arranged such that they overlap each other. By roughening the component-side and/or shaft-side joining face only with laser spots or with laser spot tracks according to the invention, the outlay for roughening and thus the cycle time can be greatly reduced, and the assembly of the camshaft can be accelerated thereby. The reason for the reduction in the cycle time is that it is no longer necessary for the whole joining face to be roughened, that is for example lasered, but only part-faces of the joining face(s), as a result of which the roughening process per se can be streamlined. The laser spots or tracks composed of individual laser spots also allow a transmittable torque to be greatly increased, since the borders of the laser spots act like barbs and hook or dig into the material of the opposite joining face. If the roughness is introduced into the shaft, the latter should first be carburised and hardened for example by means of a laser, owing to the low carbon content of said shaft. Hardening can take place before or during the introduction of the roughness.

Of course, the component joined to the camshaft can also be formed as a signal transmitter wheel, plug, gearwheel, drive or output element, tool interface, setting element, alignment element, assembly aid element, bearing ring or bushing instead of a cam. It is likewise conceivable for such an above-mentioned component to be joined to a general shaft that is not configured specifically as a camshaft. Throughout the application, the term "camshaft" can always be replaced or generalised by the term "shaft", and the term "cam" can always be replaced or generalised by the term "component".

In an advantageous development of the solution according to the invention, the predefined roughness is approx. Rz 2-25. It is possible to set a transmittable torque exactly by exactly setting the roughness. At the same time, the holding time of the heated cam and thus also the cycle time can be reduced by the roughening.

The lasered tracks are expediently aligned parallel, transversely or obliquely to the camshaft axis. Additionally or alternatively, it is conceivable for the component-side joining face and the shaft-side joining face to have a different roughness, in particular produced by a different laser power. In particular if the tracks of the predefined roughness are aligned parallel in relation to the camshaft axis, pushing onto the tracks that are now roughened and at the same hardened by the laser beam can take place more easily, the use of a raw, that is, unmachined camshaft or general shaft also being conceivable at the same time. Despite better joining in the axial direction, high torques can be transmitted between cam and shaft in this manner, since the loading direction changes during torque transmission. Lasering can achieve a comparatively hard grain in the region of the roughness, which results in a harder surface structure, in particular with softer components or shafts, said surface structure being in turn designed for transmitting higher torques. The harder surface structure can be additionally supported by comparatively fast cooling after lasering. It is also conceivable for the component-side hard surface structures to dig into the softer shaft and thereby effect a toothed connection.

A defined roughness and thereby a defined transmittable torque can be produced by a defined laser power. In addition to the variation or influence of the laser power, multiple lasering of a machining track or of a machining region is also conceivable, as a result of which the desired hardness can be set particularly precisely. Machining patterns such as checks, diamonds, rectangular patterns etc. can be produced by means of the tracks.

In an advantageous development of the solution according to the invention, the components are connected to the camshaft by a press fit and/or by a thermally joined fit, in the latter case the cams being heated. In conventional thermally joined fits, the shaft is usually cooled and/or the cam or component is heated. However, in the present case only the components, that is in the specific case the cams, are heated and then pushed over the associated shaft or camshaft. Of course, a press fit without thermal pretreatment is also conceivable.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
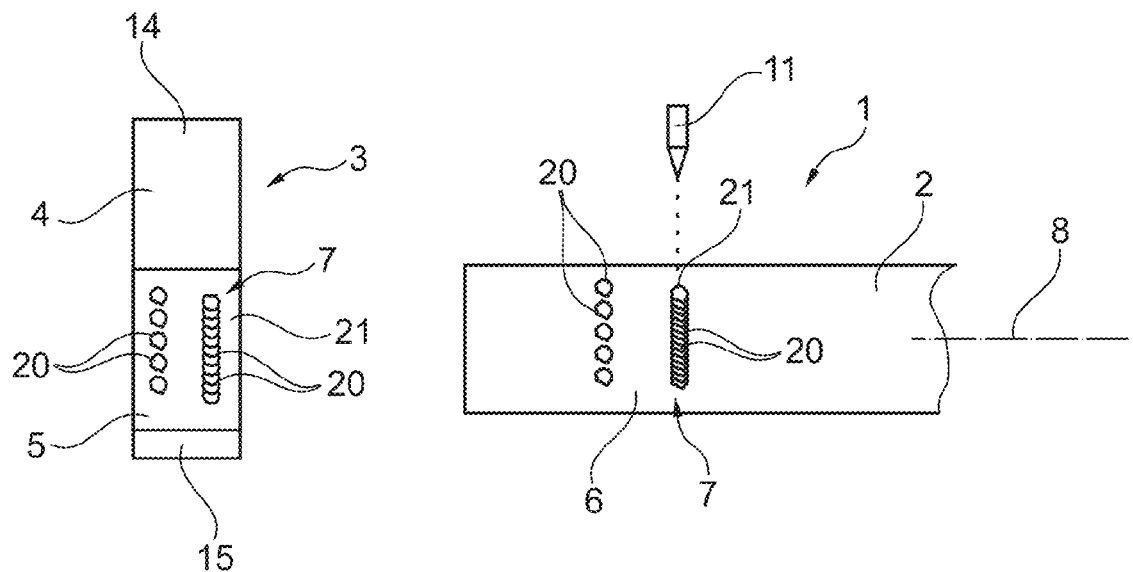
FIG. 1 schematically shows a camshaft according to the invention in an exploded diagram, FIG. 2 schematically shows a camshaft having a structural element arranged at the end, FIG. 3 schematically shows a roughness, which is introduced and hardened by means of lasers and has a track composed of individual laser spots, the centre points of the individual laser spots being arranged offset to each other and the individual laser spots being arranged such that they overlap each other, FIG. 4 schematically shows a diagram as in FIG. 3, but with a rotation direction running parallel to the tracks, FIG. 5 schematically shows a microscopic detail diagram in an intermittent embodiment of tracks from FIG. 4, FIG. 6 schematically shows a microscopic sectional diagram through a laser spot of the roughness.

According to FIG. 1, a camshaft 1 according to the invention for an otherwise not shown internal combustion engine has a shaft 2 and at least one component 3 joined thermally thereto, in this case a cam 4, which can be connected to a shaft-side joining face 6 by means of a component-side joining face 5. According to the invention, the component-side joining face 5 and/or the shaft-side joining face 6 has a roughness 7, which is introduced and hardened by means of a laser 11, which consists of individual laser spots 20 and/or has a track 21 composed of individual laser spots 20, the centre points 22 of the individual laser spots 20 being arranged offset to each other and the individual laser spots 20 being arranged such that they overlap each other (cf. also FIG. 3-5). The introduced roughness 7 can be between Rz 2-25.

In general, the component 3 can be configured as a cam 4, as in the present case, it of course also being conceivable for it to be configured for example as a signal transmitter wheel, plug, bearing ring, chain/belt wheel, gearwheel, drive or output element, tool interface, setting element, alignment element, assembly aid element or bushing. The cam-side joining face 5 and/or the shaft-side joining face 6 are furthermore roughened preferably in the region of the associated cam raised portion 14, that is a cam peak and/or the opposite base circle 15, the roughness 7 extending over a circumferential angle of approx. 20-140°, preferably of approx. 50-120°, in the region of the cam raised portion 14 and over a circumferential angle of approx. 20-140°, preferably of approx. 20-90° in the opposite region of the base circle 15. Therefore, it is not necessary for the whole joining face 5, 6 to be roughened, only some of it, which saves time and costs.

A connection of the cams 4 to the camshaft 1 or of the components 3 to the shaft 2 generally can take place by means of a simple press fit or else by means of a thermally joined fit, the cams 4, that is, the components 3, then being heated beforehand. All the shafts 2 or camshafts 1 used can be completely machined or else untreated.

The tracks 21 can be oriented parallel, transversely or obliquely to the camshaft axis 8, it also being conceivable for the component-side joining face 5 and the shaft-side joining face 6 to have a different roughness 7, in particular produced by different laser power. In general, the roughness 7 can be arranged on one or both friction partners, that is, both on the component 3 and on the shaft 2, it being conceivable for identical or different roughnesses 7 to be introduced.

In general, the component 3 can be configured as a cam 4 and have a joining face 5 that is internally turned and configured as a cam seat and onto which the roughness 7 is superposed in the form of laser structures. Internally turned cam inner seats have turning tracks (turning pass), which are oriented in the circumferential direction and have a depth, width etc. that can be set within limits. If a roughness 7 is also introduced onto such a basic structure that has been produced by machine-cutting transversely (0 ... 90° angle relative to the turning pass) to the turning pass, a check/diamond/rectangular pattern having a lot of peaks in the profile is produced. An angle to the turning pass, a spacing of the tracks 21 and a depth of the same can be varied in the process. The tracks 21 do not have to run parallel to each other but can also for example intersect. In general, such a profile allows much better torque transmission when the cam 4 is mounted. Since the actual contact area is smaller, the surface pressure in the press fit increases. The pointed structures of the roughness 7 "hook" better in the opposite joining face.

Figure 2:
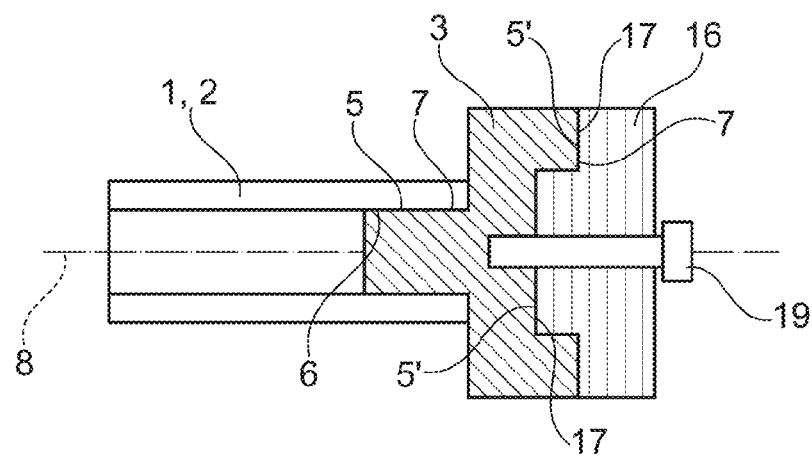

If FIG. 2 is viewed, it can be seen that a structural element 16 is attached to the component 3, component-side joining faces 5' being arranged on the component 3 and/or structural-element-side joining faces 17 being arranged on the structural element 16, which are in contact with each other when the structural element 16 is attached to the component 3, the component-side joining face 5' and/or the structural-element-side joining face 17 having a predefined roughness 7. The structural element 16 and the component 3 can be connected to each other via a screw connection 19. The component-side joining faces 5, 5' and/or the shaft-side joining face 6 and/or the structural-element-side joining face 17 can be arranged on the end face or on the circumferential face of the respective component 2, 3, 16.

The lasering produces a microhardness, which produces a harder surface structure, in particular in softer shafts 2 or components 3, by means of which a higher torque can then be transmitted. The higher microhardness can for example be promoted by fast cooling.

In general, the component 3, in particular the cam 4, can be formed from a metal having a carbon content of at least 0.4% by weight, whereas the shaft 2 has a lower carbon content. In particular, easily hardenable steels such as 100Cr6, C60, C45 or sintered materials such as A1100, 1200, 1300, 1500 or cast materials such as EN GJL 250 or EN GJS 700 are considered as materials for the cam 4 or the component 3 in general. Air-hardened steels can also generally be used for the components 3. However, steels such as E335 and C60E, which must be carburised where necessary to introduce the roughness 7 are in particular considered for the shaft 2.

In FIG. 3, a rotation direction 23 of the shaft 2 runs orthogonally to the direction of the tracks 21, in this case borders/edges 24 of the tracks 21 particularly affecting the maximum possible torques to turn. In FIG. 4 however, the rotation direction 23 of the shaft 2 runs parallel to the direction of the tracks 21, as a result of which an even higher resistance to slipping and thus an even greater torque transmission capacity can be achieved. The torque transmission capacity and thus the resistance to slipping between shaft 2 and component 3 are affected by the border 24 thrown up when the laser spots are produced (cf. FIG. 3-6), which is usually arranged on the component 3 or cam 4 and digs into the shaft 2 when it is joined to the same. The digging in is made possible owing to the softer material of the shaft 2 compared to the material of the component 3.

In FIG. 3-6, the roughness 7, for example the laser spots 20, are always introduced into the component 3 or cam 4, it of course also being conceivable for laser spots to be produced on the shaft 2 and thus borders 24 to be produced on the shaft 2, it being necessary for the shaft 2 to undergo carburisation first in order to be hardened during production of the laser spots. Carburisation can be omitted if the shaft 2 is manufactured from a carbon-rich material such as C60E. This has the advantage in particular that only a single component, namely the shaft 2, has to be machined and not a multiplicity of components 3 or cams 4. In experiments, a torque to turn could be increased from approx. 135 to 225 Nm if laser spots were produced on the shaft 2, and even to 325 Nm if laser spots were produced on the component 3, which corresponds to an increase of over 100%. Torque to turn means the moment at which the component 3 on the shaft 2 begins to slip.

The laser-structuring of the cam seat (on the shaft and/or cam side) is a promising method for achieving considerable increases in the torque to turn if cams 4 are joined thermally to the shaft 2. In further studies, the focus was placed on improving the cost-effectiveness while simultaneously increasing the torque to turn. It was found that a higher torque to turn can be achieved if only the cam 4 is structured using lasers 11. If the shaft 2 and not the cam 4 is structured, a higher torque to turn is achieved in comparison with previous, purely thermal joins, but not as high as with laser-structuring of the cam 4. This is attributable to the cam/shaft material pair used. A carbon-rich steel (e.g. C60 or 100Cr6) should be used as the material for the cams 4, since said material can be hardened more easily owing to the higher carbon content than the E 335 steel with a lower carbon content usually used for the shaft 2. During laser-structuring, a large amount of energy is introduced locally, which ensures a microhardness precisely in the region of the structures thrown up, that is, in particular the borders 24. For this reason, the borders 24 (thrown-up portions) produced during structuring in the cam 4 dig into the shaft 2 more than would be the case the other way round. If the shaft 2 can also be hardened and if it is structured using lasers, this effect can also be observed vice versa. The hard structures on the shaft dig into the cam counter faces.

Furthermore, it has been found that individual laser spots 20 or laser spots 20 that partially overlap each other (cf. FIG. 3-6) likewise result in an increase in the torque to turn, since more barb structures can be formed on the surface thereby compared to a continuous "laser track", said structures then being able to dig into the counter face.

The invention claimed is:

1. A camshaft for an internal combustion engine, comprising: shaft and at least one component thermally joined thereto, the at least one component connected via a component-side joining face to a shaft-side joining face of the shaft,
wherein at least one of the component-side joining face and the shaft-side joining includes a predefined roughness introduced and hardened via a laser,
the predefined roughness defining at least one track composed of a plurality of individual laser spots, wherein each of the plurality of individual laser spots include a centre arranged offset to each other, and wherein the plurality of individual laser spots are respectively arranged overlapping each other.

2. The camshaft according to claim 1, wherein the at least one component is composed of a metal having a carbon content of at least 0.4% by weight, whereas the shaft has a lower carbon content.

3. The camshaft according to claim 2, wherein the at least one component is composed of at least one of a C60 steel, a 100Cr6 steel and a sintered material.

4. The camshaft according to claim 3, wherein the shaft includes a carbon-rich material having a carbon content of at least 0.4% by weight.

5. The camshaft according to claim 1, wherein the shaft is at least one of carburised before introducing the roughness via the laser and composed of a carbon-rich material having a carbon content of at least 0.4% by weight.

6. The camshaft according to claim 5, wherein the predefined roughness is Rz 2 to 25.

7. The camshaft according to claim 6, wherein the at least one component includes at least one of a cam, a signal transmitter wheel, a chain wheel, a belt wheel, a gearwheel, a plug, a drive element, an output element, a tool interface, a setting element, an alignment element, an assembly aid element, a bearing ring and a bearing bushing.

8. The camshaft according to claim 1, wherein the shaft is composed of at least one of a E335 steel and a C60E steel, and the at least one component is composed of at least one of a C60 steel, a 100Cr6 steel and a sintered material.

9. The camshaft according to claim 1, wherein the predefined roughness is Rz 2 to 25.

10. The camshaft according to claim 1, wherein the at least one component includes at least one of a signal transmitter wheel, a chain wheel, a belt wheel, a plug, a gearwheel, a drive element, a tool interface, a setting element, an alignment element, an assembly aid element, a bearing ring, a bearing bushing and a cam.

11. The camshaft according to claim 1, wherein at least one of:
the predefined roughness defines a plurality of tracks, the respective tracks being oriented at least one of parallel, transversely and obliquely to a shaft axis, and
the component-side joining face and the shaft-side joining face have a different roughness.

12. The camshaft according to claim 1, further comprising a structural element attached to the at least one component via at least one of a second component-side joining face arranged on the component and a structural-element-side joining face arranged on the structural element in contact with each other when the structural element, wherein at least one of the component-side joining face and the structural-element-side joining face include a roughness introduced and hardened via a laser, the roughness defining a track composed of a plurality of individual laser spots, wherein each of the plurality of individual laser spots have a centre points arranged offset to each other, wherein the plurality of individual laser spots are respectively arranged overlapping each other.

13. The camshaft according to claim 12, wherein at least one of the component-side joining face, the shaft-side joining face and the structural-element-side joining face is arranged on at least one of an end face and a circumferential face of the shaft, the component and the structural element, respectively.

14. A component for a camshaft, comprising: a component-side joining face including a predefined roughness introduced and hardened via a laser, the predefined roughness defining at least one track, the at least one track being composed of a plurality of individual laser spots, the plurality of individual laser spots each having a centre point arranged offset to each other, wherein the plurality of individual laser spots are respectively arranged overlapping each other.

15. The component according to claim 14, wherein the component-side joining face is composed of a metal having a carbon content of at least 0.4% by weight.

16. The component according to claim 14, wherein the component-side joining face is composed of at least one of a C60 steel, a 100Cr6 steel and a sintered material.

17. The component according to claim 14, wherein the predefined roughness ranges from Rz 2 to 25.

18. The component according to claim 14, wherein the predefined roughness defines a plurality of tracks, wherein the respective tracks are oriented at least one of parallel, transversely and obliquely to an axis of rotation.

19. The component according to claim 18, wherein the predefined roughness is Rz 2 to 25.

20. A camshaft for an internal combustion engine, comprising:
- a shaft defining a shaft-side joining face, the shaft being composed of a carbon-rich material having a carbon content of at least 0.4% by weight;
- at least one component defining a component-side joining face, the at least one component being thermally joined via the component-side joining face to the shaft-side joining face of the shaft;
- wherein the component-side joining face and the shaft-side joining face respectively include a predefined roughness ranging from 2 to 25 Rz introduced via a laser, wherein the predefined roughness of the component-side joining face and the shaft-side joining face respectively defines a plurality of tracks each being composed of a plurality of individual laser spots arranged overlapping each other, and the plurality of individual laser spots each including a centre point arranged offset from one another;
- wherein the plurality of tracks defined on the component-side joining face and the shaft-side joining face are respectively oriented at least one of parallel, transversely and obliquely to a shaft axis.

* * * * *